(12) United States Patent
Abad et al.

(10) Patent No.: US 8,361,935 B2
(45) Date of Patent: Jan. 29, 2013

(54) METAL FREE CROSSLINKING OF GALACTOMANNAN

(75) Inventors: Carlos Abad, Richmond, TX (US);
Mathew M. Samuel, Sugar Land, TX (US); Kevin W. England, Houston, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 189 days.

(21) Appl. No.: 12/539,243

(22) Filed: Aug. 11, 2009

(65) Prior Publication Data

US 2010/0056403 A1    Mar. 4, 2010

Related U.S. Application Data

(60) Provisional application No. 61/092,897, filed on Aug. 29, 2008.

(51) Int. Cl.
*C09K 8/68* (2006.01)
*E21B 43/16* (2006.01)

(52) U.S. Cl. .................. 507/209; 507/273; 166/305.1
(58) Field of Classification Search .................. 507/209, 507/273; 166/305.1
See application file for complete search history.

(56) References Cited

U.S. PATENT DOCUMENTS

| 3,297,604 A | 1/1967 | Germino |
| 5,614,475 A | 3/1997 | Moorhouse et al. |
| 5,697,444 A | 12/1997 | Moorhouse et al. |
| 6,022,717 A | 2/2000 | Brady et al. |
| 6,387,853 B1 | 5/2002 | Dawson et al. |
| 7,007,752 B2 | 3/2006 | Reddy et al. |
| 2006/0003900 A1 * | 1/2006 | Hanes, Jr. ............. 507/203 |
| 2006/0030493 A1 | 2/2006 | Segura |
| 2007/0275862 A1 | 11/2007 | Melbouci et al. |

FOREIGN PATENT DOCUMENTS

| GB | 2416792 | 2/2006 |
| GB | 2422839 | 8/2006 |
| WO | 2007136798 | 11/2007 |

OTHER PUBLICATIONS

Advanced Organic Chemistry—March, J. 1985, Wiley, Third Edition, pp. 1057-1060, 1062-1065, 1084.
Comprehensive Organic Transformations—Larock, R.C. 1999, Wiley-VCH publishers, Second Edition, p. 981.

* cited by examiner

*Primary Examiner* — Ling Choi
*Assistant Examiner* — Aiqun Li
(74) *Attorney, Agent, or Firm* — Jeremy Tillman; Daryl Wright; Robin Nava

(57) ABSTRACT

Methods of treating a subterranean formation are disclosed, using a fluid including an essentially metal-free organic crosslinker selected from amines, diamines, poly amines, polyamino polymers, alcohols, polyols, polyhydroxy polymers, hydroxyl amines, peptides and proteins, combined with a polysaccharide or cellulosic material having oxidized functional groups. The fluid is then introduced into a wellbore penetrating the formation to contact the formation. The polysaccharide or cellulosic material may have aldehyde groups as one example of an oxidized group, or any other suitable oxidized functional group. The polysaccharide or the cellulosic material may be oxidized using at least one of an enzymes, oxidizers, photooxidation, bacteria, catalyst, or other suitable technique. The fluid may also further include an inorganic crosslinker.

14 Claims, 2 Drawing Sheets

METAL FREE CROSSLINKING OF GALACTOMANNAN

BACKGROUND

1. Field of the Invention

This disclosure relates generally to methods and compositions to tailor polymers for use in the oil field services industry. More specifically, this invention relates to methods and compositions to tailor polymers to modify the viscosity of oil field services fluids.

2. Description of the Related Art

The statements in this section merely provide background information related to the present disclosure and may not constitute prior art.

Guar and guar derivatives are widely used in fluids for use in oil-well fracturing and stimulation applications. They are particularly used in hydraulic fracturing fluids, to initiate and propagate the hydraulic fracture, to provide rheology to transport proppant through the hydraulic fracture, to provide fluid loss control, and to suspend proppant in the hydraulic fractures after a hydraulic fracturing treatment until the hydraulic fracture has closed onto the proppant to hold it in place. They are used in combination with several other chemicals, and particularly crosslinkers to provide optimum crosslinked gels, necessary to transport and suspend the proppant.

The guar used in the oil field services industry can be either natural guar or derivatized guar. The derivatized guar can be hydroxypropyl guar (HPG), cationic guar, carboxymethyl guar (CMG), carboxymethyl hydroxypropyl guar (CMHPG), hydroxyethyl guar (HEG), carboxymethyl hydroxyethyl guar (CMHEG), hydrophobically-modified guar (HMG), hydrophobically-modified carboxymethyl guar (HMCMG) and hydrophobically-modified hydroxyethyl guar (HMHEG).

Conventional natural and derivatized guars have primary and secondary hydroxyl (—OH) groups which are the typical functionality responsible for their crosslinking. In the oilfield, inorganic crosslinkers such as borates, zirconates, titanates, aluminates, chromates, and hafnium are used to increase the gel viscosity. The type of inorganic crosslinker and the conditions used depends on fluid requirements. Borate crosslinkers are commonly used for low and medium temperature applications due to their shear insensitivity. It is commonly accepted that borate ions are responsible for the crosslinking of guar derivatives through interaction with the cis hydroxyls in the positions 2 and 3 of the manose and galactose monosaccharides. Organometalic crosslinkers are also used to increase the high temperature stability of the fluids. Complexes of transition metals such as Zr, Ti, Al, Cr, Hf, are commonly used as metallic crosslinkers. It is commonly accepted that organometallic ions are responsible for the crosslinking of guar derivatives through interaction with either the cis hydroxyls in the positions 2 and 3 of the mannose and galactose monosaccharides, or alternatively with the carboxylate groups introduced in the structure through derivatization of the natural guar polysaccharide. Organometallic crosslinked fluids are typically delayed fluids for which suitable ligands and delay agents are required to achieve acceptable crosslinking delay. Organometallic crosslinkers are typically more effective in crosslinking guar derivatives than natural guar.

In the applications disclosed in the oilfield literature using guar and guar derivatives, it is commonly accepted that all the chemical functionality required for the polymer to effectively crosslink is available from the source polymer (be that functionality hydroxyls in natural guar or hydroxyl and or carboxylate groups in derivatized guar) prior to being pumped into the wellbore.

A typical process for using fluids comprising these polymers includes the steps of hydrating the natural guar or guar derivative in an aqueous medium, providing a crosslinker, and preferably some means of delaying the interaction between polymer or crosslinker. Typically, the use of encapsulated crosslinkers, the delayed release of activators, or the addition of a substantial amount of competing ligands as complexing agents for the crosslinker metal have proven as effective methods in a variety of applications.

The absence of alternative functional chemical moieties to the hydroxyl and or carboxylate groups present in guar and guar derivatives impairs the ability to react these polymers in aqueous medium through other common chemistry reactions. This in turn prevents the use of a variety of other organic crosslinkers in use in other industries.

Abad et al. GB2422839B, disclosed methods to functionalize and further crosslink guar and guar derivatives by introducing alternative functionalities such as epoxy or aldehyde, in the guar backbone.

The use and crosslinking of oxidized guar, aldehyde containing guar, and similar aldehyde or carbonyl containing polymers through chemical reaction of the aldehyde group has been disclosed in the past. Germino et al. U.S. Pat. No. 3,297,604, disclosed the use of galactose oxidase enzyme to produce oxidized guar gum, yielding aldehyde bearing oxidized products which were crosslinked with amino polymers, polyhydroxy containing polymers and proteins. Brady et al., U.S. Pat. No. 6,022,717 described a novel process to oxidize guar using a galactose oxidase enzyme. Segura, GB2416792A discloses a method of treating a subterranean formation with a treating fluid comprising a carbonyl containing compound and an amine containing compound. Such carbonyl compound can be obtained by oxidation of a guar polymer with periodate. Abad et al. GB2422839B also disclose the use of aldehyde containing polymers such as polyacroleine, oxidized guar, oxidized starch, acroleine grafted guar, guar polyaldehyde, and polymers containing aldehyde precursors such as acetals and hemiacetals as viscosifying agents for wellbore operations. Melbouci et al. US2007/0275862 disclose oilfield servicing compositions including fracturing and stimulation fluids containing and aldehyde guar produced by enzymatic oxidation of guar or guar derivative with galactose oxidase combined with catalase and peroxidase.

All the crosslinked treatments described in the prior art only consider the use of functional polymers that have been synthesized away from the wellsite and then transported to the wellsite for use in wellbore treatments. In addition the treatment disclosed in the prior art do not propose methods of delaying the chemical interaction between the functional polymer and the organic crosslinker, and rely on the reaction kinetics and diffusion of the reactive species for suitable crosslinking control. This time delay is critical for some downhole applications such as fracturing, where a non-delayed fluid can cause excessive friction in the pipe, and ultimately inability to pump at the required rate, lack of sufficient fracture width, or undesired pressure increase up to maximum allowed for the treatment, all which can result in failed operations or service quality issues. Time delay is also important in applications where a plugging mechanism is required such as internal filtercake formation, water control, diversion in wellbores for different stages in a treatment, diversion in natural fractures for directional steering of the main hydraulic fracture wing, or diversion in formations of different permeability, loss circulation while drilling, and the like. In these applications substantial viscosity development or gellation is required once the treatment has substantially penetrated the zone of the wellbore or the geologic formation of interest so that appropriate performance is ensured.

In the vast majority of the wellbore applications where viscosification, crosslinking or gellation is required downhole, delaying mechanisms are typically needed. Methods of introducing additional delay to the interaction between functionalized polymers and the organic crosslinkers are needed. Methods to tailor crosslinking systems to modify the viscosity of polymer-based systems are needed. It is desirable that these methods are effective, efficient, and reliable over a wide range of temperatures and pressures.

SUMMARY

In some embodiments, methods of treating a subterranean formation are disclosed, using a fluid including an essentially metal-free organic crosslinker selected from amines, diamines, poly amines, polyamino polymers, alcohols, polyols, polyhydroxy polymers, hydroxyl amines, peptides and proteins, combined with a polysaccharide or cellulosic material having oxidized functional groups. The fluid is then introduced into a wellbore penetrating the formation to contact the formation. The polysaccharide or cellulosic material may have aldehyde groups as one example of an oxidized group, or any other suitable oxidized functional group. The polysaccharide or the cellulosic material may be oxidized using at least one of an enzymes, oxidizers, photooxidation, bacteria, catalyst, or other suitable technique. The fluid may also further include an inorganic crosslinker.

In some instances, the aqueous medium used to form the fluid is contaminated, and fluid viscosity is essentially unaltered by contaminants present in the aqueous medium. Also, in some other cases, the polysaccharide or the cellulosic material is at least partially oxidized prior to hydrating or while hydrating in an aqueous medium.

Some other embodiments are methods of forming a fluid containing an essentially metal-free organic crosslinker selected from amines, diamines, poly amines, polyamino polymers, alcohols, polyols, polyhydroxy polymers, hydroxyl amines, peptides and proteins, combined with a polysaccharide or cellulosic material having oxidized functional groups.

In yet another embodiment, a method is disclosed which includes providing a fluid containing an essentially metal-free organic crosslinker selected from amines, diamines, poly amines, polyamino polymers, alcohols, polyols, polyhydroxy polymers, hydroxyl amines, peptides and proteins, combined with a polysaccharide or cellulosic material having oxidized functional groups, and then contacting a target material with the fluid to treat a target zone in a subterranean formation.

BRIEF DESCRIPTION OF THE FIGURES

For further understanding of some embodiments, and the advantages thereof, reference is now made to the following description taken in conjunction with the accompanying figures, in which.

DESCRIPTION

Figure 1:
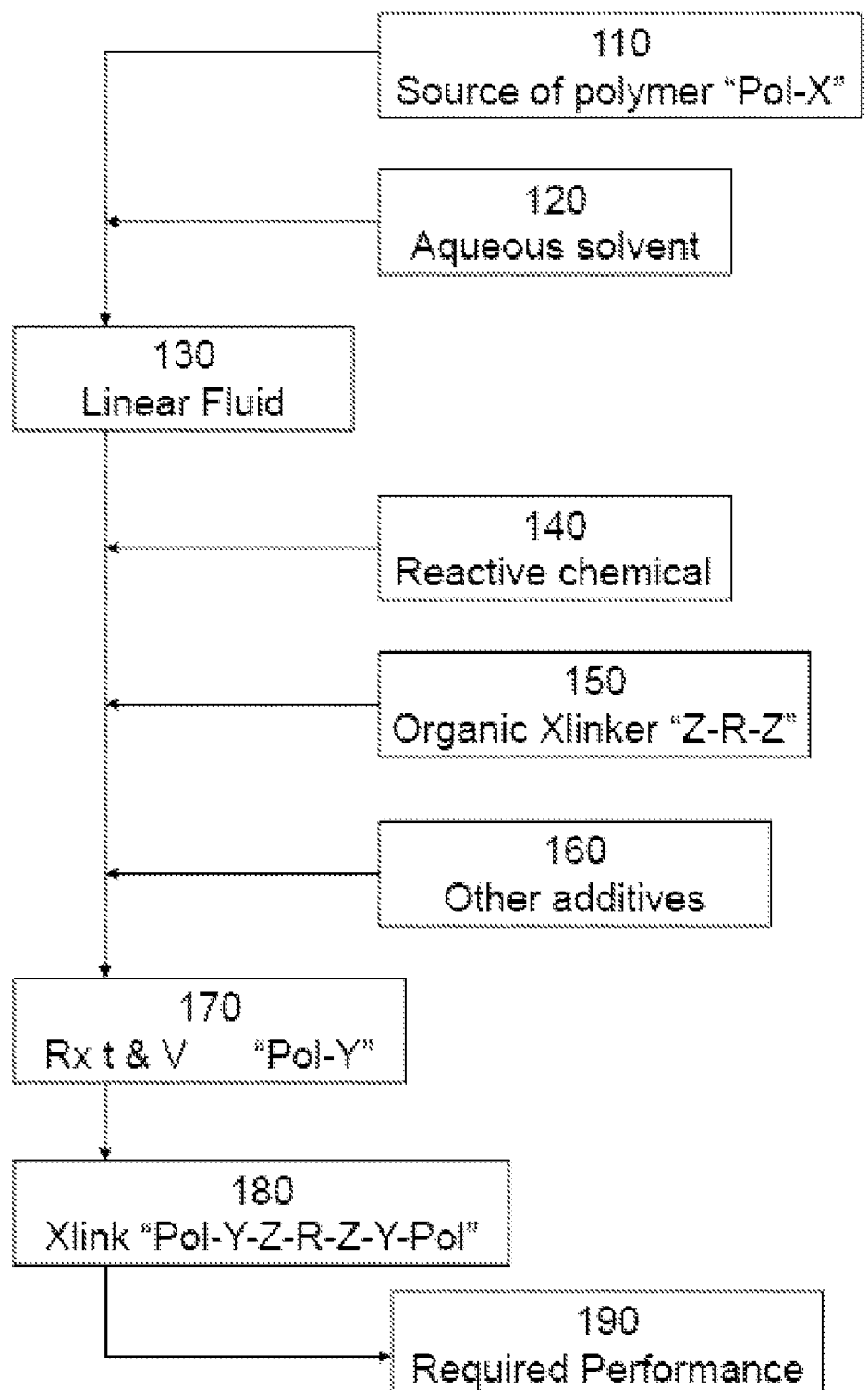
FIG. 1 is a flowchart illustrating a first method embodiment.

At the outset, it should be noted that in the development of any such actual embodiment, numerous implementation-specific decisions must be made to achieve the developer's specific goals, such as compliance with system related and business related constraints, which will vary from one implementation to another. Moreover, it will be appreciated that such a development effort might be complex and time consuming but would nevertheless be a routine undertaking for those of ordinary skill in the art having the benefit of this disclosure. In addition, the composition used/disclosed herein can also comprise some components other than those cited. In the summary of the invention and this detailed description, each numerical value should be read once as modified by the term "about" (unless already expressly so modified), and then read again as not so modified unless otherwise indicated in context. Also, in the summary of the invention and this detailed description, it should be understood that a concentration range listed or described as being useful, suitable, or the like, is intended that any and every concentration within the range, including the end points, is to be considered as having been stated. For example, "a range of from 1 to 10" is to be read as indicating each and every possible number along the continuum between about 1 and about 10. Thus, even if specific data points within the range, or even no data points within the range, are explicitly identified or refer to only a few specific, it is to be understood that inventors appreciate and understand that any and all data points within the range are to be considered to have been specified, and that inventors possessed knowledge of the entire range and all points within the range. The statements made herein merely provide background information related to the present disclosure and may not constitute prior art or describe some embodiments illustrating the invention.

Embodiments described herein are techniques treating subterranean formations using, at least in part guar, guar derivatives, functionalized guar, functionalized guar derivatives, and preferably oxidized guar or oxidized guar derivatives. In particular, use of organic compounds in combination with modified polysaccharides, in particular galactomannans, and more in particular oxidized guar to obtain essentially metal free crosslinked gels suitable for use in wellbore applications such as, but not limited to, hydraulic fracturing, diversion, acid gellant, kill pills, lost circulation treatments, coiled tubing cleanout, water control treatments, thickener, anti settling agent, and the like. Some advantages include water quality independent system (use of produced water, treatment flowback water, some types of waste water, sea water or high density brines), early viscosity development (i.e. low temperature without boron), and effective use/enhanced effect with particulates and fibers. In some embodiments, the polysaccharide or cellulosic based material is oxidized in situ during an operation to affect the rate and/or timing of crosslinking.

In one embodiment, described in FIG. 1, a method of treatment 100, is composed of the following. A source of a water soluble polymer 110 "pol-X" (aqueous solution, solid, emulsion, dispersion) containing functional groups "X" is provided and metered, into a stream of aqueous solvent 120 and substantially hydrated to a state described as linear fluid 130. At least one stream of reactive chemicals 140 is also metered into the fluid stream. An organic crosslinker "Z—R—Z" stream 150 containing at least two functional groups "Z" and a bridge backbone "R" is also metered into the fluid stream. This organic crosslinker is defined as a chemical able to react with polymers with functional groups "Y", but not substantially with functional groups "X", to form links "Y—Z—R—Z—Y". A suite of other additives which may be required for the effectiveness of the treatment 160 may also be provided, including, but limited to, surfactants, activators, bactericides, clay stabilizers, diverters, emulsifiers, fluid loss additives, friction reducers, rheology modifiers, non-emulsifying agents, buffers, anti-sludge, H2S inhibitors, paraffin and asphaltene inhibitors, oxygen scavangers, wettability modifiers, surface tension reducers, iron control, mutual solvent, microemulsion, foaming agents, high temperature stabilizers, fibers, particulates, breakers, inorganic scale inhibitors, organic scale inhibitors, corrosion inhibitors, secondary crosslinkers, and the like. Enough contact and reaction time and reactor volume 170 is provided in the process 100 for the polymer 110 and the reactive chemicals 140 to transform at least partially some of the functional groups "X" in the polymer into different functional groups "Y". Chemical reaction between the newly formed "Y" groups with the "Z" functional groups in the organic crosslinker 150 yields a viscosified, crosslinked, gelled, or solidified fluid 180 with sufficient organic crosslink points "Pol-Y—Z—R—Z—Y-Pol" so as to be capable of providing a desired performance downhole 190. Additional chemical reactions, chemical and or physical effects as provided by other additives 160 may, when necessary, further enhance the fluid viscosity, and other rheological properties, so as to be capable of further improving the desired performance downhole 190. Those skilled in the art will recognize that the process 100 provides further delay and as such, improved control of the viscosity development and the extent of gelation through organic reactions of aqueous wellbore fluids based in polymeric fluids such as those based on guar and guar derivatives. Secondary crosslinkers described in this embodiment are those typically used for crosslinking aqueous polymeric fluids used in the oilfield industry, such as borate, aluminum, chromium, titanium, hafnium, or zirconium metallic crosslinkers, when used in combination with the organic crosslinking mechanisms described in this embodiment.

In one embodiment, additionally delayed crosslinked fluids are obtained downhole, where the functional group "Y" is aldehyde, by in situ preparing aldehyde containing polymer during the pumping stages of a wellbore treatment. For these fluids and methods the fluid viscosity development is primarily controlled by the in situ generation downhole of the aldehyde groups in native guar or guar derivatives, starch or starch derivatives or other water soluble polymers through know chemical reactions. Examples of such reactions are grafting acroleine, the inorganic catalyzed alcohol oxidation with Ce, Cr, Mn, or periodate, or the enzymatic oxidation of alcohols with enzymes such as galactose oxidase. Examples of methods, conditions and stoichiometries required to achieve polymers with substantial concentrations of aldehyde groups are disclosed in the literature. A comprehensive list of reactions that can be used for the purpose of the invention can be found in March, "Advanced Organic Chemistry", Third Ed. J. March, 1985, J Willey and Sons, "Comprehensive Organic Transformations", R. C. Larock, Willey VCH, 1999. In general all chemical reactions yielding aldehyde and carbonyl group containing polymers that can be effectively carried out in aqueous brines can be consider as pertaining to the invention.

Particularly interesting polymers for the invention are natural and modified guar gum. Oxidation of guar can be carried out chemically or preferably enzymatically by galactose oxidase. Preferably neutral or anionic or amphoteric guar that has been oxidized by galactose oxidase, additionally catalase may be used in conjunction with the galactose oxidase. Galactose oxidase can be applied to solid, slurry, or solution forms of guar products: e.g., shredded, powder, flake, and pellet forms of neutral, anionic or amphoteric guar. Derivatized guar, such as those containing hydroxypropyl groups can also be used in the oxidized form. The aldehyde bearing products can give condensation products with products containing the amino functionality or similar.

Starch is a naturally occurring polysaccharide which contains several aldehyde groups. Polyacroleine is a synthetic polymer containing one aldehyde group per repeating unit. Oxidized polysaccharides have been obtained by different oxidation mechanisms, including reaction with metals such as osmium, cerium, chromium, or manganese in different oxidation states. Peroxicompounds such as hydrogen peroxide, periodate ions, organic peroxides and persulfates have also been used for the purpose of oxidizing polysaccharides. United States Patent Application Publication Number 2007/0275862 discloses a method to oxidize guar gum, a galactomannan by enzymatic reaction with a galactoxidase enzyme, and is incorporated by reference thereto. While the purpose is to improve the viscosity yield of the polysaccharide, it has been found that the presence of multiple aldehyde groups in the polysaccaride backbone can be used to improve some of the typical performances that could be obtained with the polymer disclosed using the known technology such as the use of metal crosslinkers like boron, aluminum, zirconium and titanium to enhance fluid viscosity.

Mild oxidizers, enzymes and photo catalytic reactions can be used to oxidize guars and similar polymers used in the oilfield. These oxidations can convert the carbon 6 hydroxyl group in an aldehyde group or the vicinal hydroxyl groups of carbons 2 and 3 in two aldehydes by rupturing the carbon-carbon bond. Also, the oxidation of the Galactose can result in aldehydes, ketones and carboxylic acid groups.

It has been disclosed in the prior art U.S. Pat. No. 3,297,604, GB2416792A, GB2422839B that the presence of organic compounds capable of reacting with aldehyde groups in aqueous media such as amine containing compounds (like as diamines, polyamines, polypeptides and the like), or alcohols containing compounds (like diols, polyols or sugar and sugar derivatives) provides with an effective means of essentially undelayed crosslinking reactions involving aldehyde bearing polymers, such as polyaldehyde starch or polyaldehyde guar, or oxidized guar. For these fluids viscosity is controlled primarily by the kinetics of the crosslinking reaction between amine or alcohol compounds, and the aldehyde containing compound.

The condensation reaction of aldehydes with amine functionalities, such as primary amines, is well known. Another advantage of the methods of the invention is that as disclosed by Abad et al. GB2422839B, the organic links between aldehyde and amines can be labile at suitable pH and temperature conditions, resulting in non permanent bonds, such as —N=CH— or —NH—CH$_2$— groups that can degrade on prolonged exposure to high temperature, thus enabling the molecule to become self degrading. This can help eliminate uncertainty about the effect of breaker concentrations, and placement on the breaking of the gels in the proppant-pack in applications where such degradability is of interest such as hydraulic fracturing.

Examples of organic crosslinkers suitable include, but are not limited to, alkyl diamines such as ethylene diamine, propylene diamine, butylene diamine, hexamethylene diamine, dodecyl diamine and the like. Aromatic diamines such as 1,4 diamino benzene are also suitable for the invention. Amino acids containing more than one amino group such as arginine or lysine, or more than one nitrogen atom such as histidine can be useful. Polypeptides containing multiple amino groups can also be used. Other polyamino containing compounds such as diethylene triamine, triethylene tetramine, tetraethylene pentamine, and the like can also be suitable organic crosslinkers. Other amino-containing water soluble polymers such as polyvinyl amine, chitosan, and the like can be used.

Examples of some other organic crosslinkers suitable are alkyl diols such as ethylenegylcol, propyleneglycol, 1,4 butane diol, 1,6 hexanediol, and the like. Aromatic diols such as resorcinol can also be used. Polyols, such as glycerol, sorbitol, eritritol, erythritol, or monosaccharides such as glucose, fructose, mannose, or galactose can be used. Other polyols such as polyvinyl alcohol and partially hydrolyzed polyvinyl acetate can also be suitable.

Further, some embodiments involve the partial oxidation of polymers on-the-fly while hydrating the polymer or before hydrating the polymer. This oxidation will provide functional groups (i.e. aldehydes) that can be crosslinked with organic crosslinkers and provide the required initial viscosity. While the fluid is travelling through the tubular section of the wellbore, adequate hydration occurs, and the polysaccharide may even be further crosslinked with conventional metal crosslinkers (live and delayed) to maximize its viscosity for proppant transport and suspension.

While one purpose is to provide an enhancement of the viscosity of the fluid at low temperatures, it is found that high temperature viable fluids can be prepared by adding metal crosslinkers, in addition, to the formulation.

Those skilled in the art will easily recognize that in some cases, the use of organic crosslinkers can provide improved gels over typical crosslinked fluids as the extent of the crosslinking reaction is less prone to alteration by the presence of trace contaminants in the water, such as acids, bicarbonates, or bacteria, or even those encountered often in non purified water sources, or produced water, thus yielding more robust fluids.

In yet other embodiments, non-metal based crosslinking systems are used to strengthen borate crosslinked polysaccharide gels, or even reduce the shear sensitivity of zirconium and titanium crosslinked polysaccharide gels.

Figure 2:
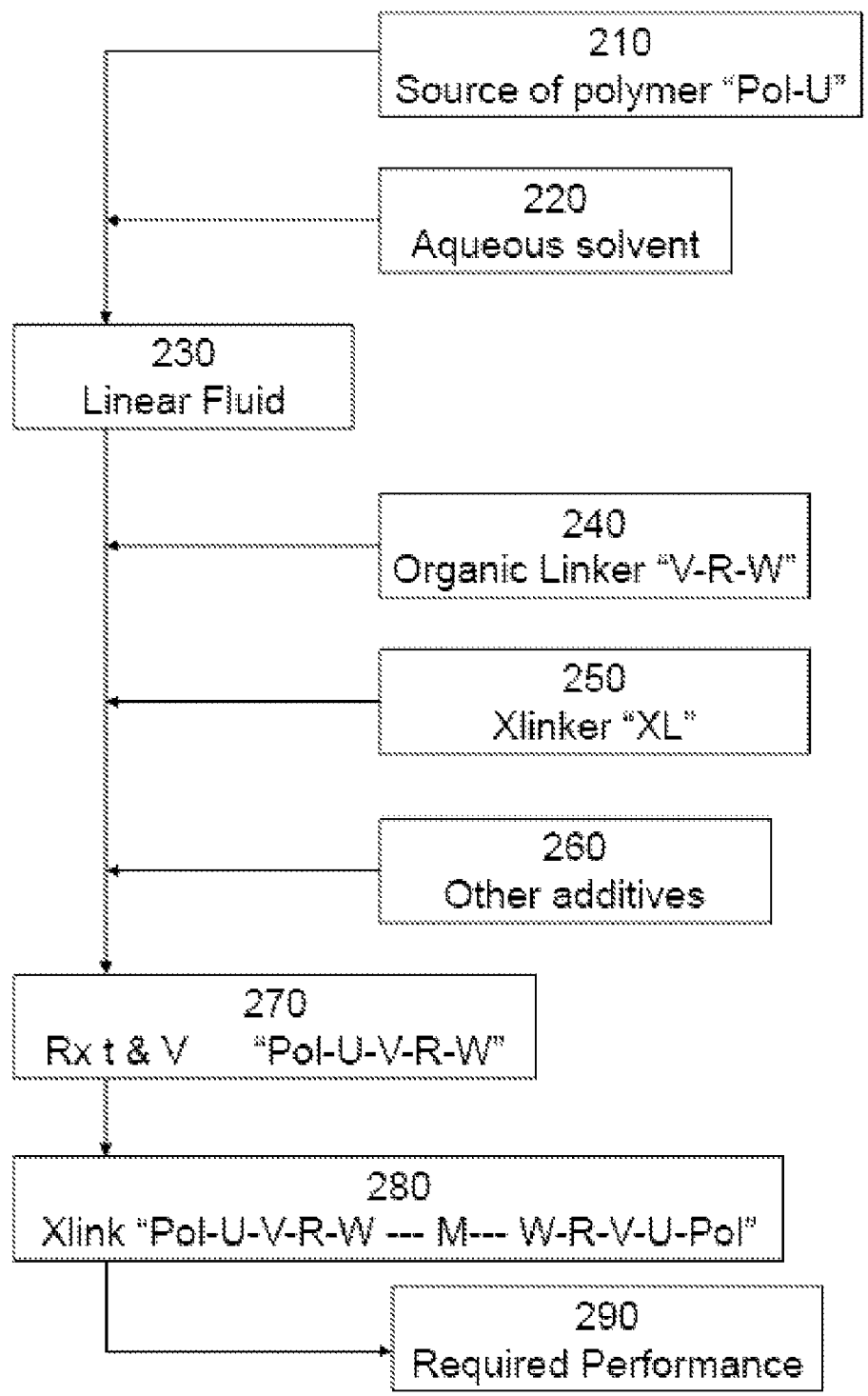
FIG. 2 is a flowchart illustrating a second method embodiment.

In another embodiment, a process 200 described in FIG. 2, is disclosed, which allows reactive functionalities to be incorporated into the polymer that can increase the number of active sites for organic crosslinking, provide more active sites for metallic crosslinking, change the type of active sites present in a polymer and/or that can alter the strength of the crosslinking. The process 200 comprises the following. A source of a water soluble polymer 210 "pol-U" (aqueous solution, solid, emulsion, dispersion) containing functional groups "U" is provided and metered, into a stream of aqueous solvent 220 and substantially hydrated to an state that will be named linear fluid 230. An organic linker molecule "V-R-W" stream 240 containing at least one crosslinkable functional group "W" a bridge backbone "R", and a bridging group "V" is also metered into the fluid stream. This organic linker molecule is defined as a chemical able to react with polymers with functional groups "U" to form links "U-V". At least one stream of crosslinker "XL" 250 is also metered into the fluid stream. A suite of other additives required for the effectiveness of the treatment 260 may also be provided, including surfactants, activators, bactericides, clay stabilizers, diverters, emulsifiers, fluid loss additives, friction reducers, rheology modifiers, non-emulsifying agents, buffers, anti-sludge, H2S inhibitors, paraffin and asphaltene inhibitors, oxygen scavengers, wettability modifiers, surface tension reducers, iron control, mutual solvent, microemulsion, foaming agents, high temperature stabilizers, fibers, particulates, breakers, inorganic scale inhibitors, organic scale inhibitors, corrosion inhibitors, secondary crosslinkers, and the like. Enough contact and reaction time and reactor volume 270 is provided in the process 200 for the polymer 210 and the linker chemical 240 to transform at least partially some of the functional groups "U" in the polymer into different functional groups "W" creating functional polymers "pol-U-V-R-W". Chemical reaction between the "W" group containing polymers with the crosslinker 250 yields a viscosified, crosslinked, gelled, or solidified fluid 280 with sufficient organic crosslink points "Pol-U-V-R-W-XL-W-R-V-U-Pol" so as to be capable of providing a desired performance downhole 290. Additional chemical reactions, chemical and or physical effects as provided by other additives 260 can when necessary further enhance the fluid viscosity, and other rheological properties, so as to be capable of further improving the desired performance downhole 290. Those skilled in the art will recognize that the process 200 provides further delay and as such better control of the viscosity development and the extent of gelation through organic reactions of aqueous wellbore fluids based in polymeric fluids such as those based on guar and guar derivatives. Crosslinkers as described in this embodiment are those chemicals typically used in the oilfield industry to crosslink aqueous polymeric fluids such as borate, aluminum, chromium, titanium, hafnium, or zirconium based metallic crosslinkers.

According to some embodiments, enhanced boron crosslink-ability can be obtained by reacting aldehyde containing polysaccharide polymers with chemicals containing amino moieties that can form "U-V" links as well as other crosslinkability enhancing functionalities "W" such as (A) amino containing monosaccharides such as glucosamine, providing several hydroxyl groups that can be effective crosslinking sites for boron species; such amino containing compounds can react with aldehyde containing polysaccharides to provide polysaccharides with pendant groups that can be more easily accessible, and or form stronger complexes with boron than the typical mannose or galactose residues of guar and typical guar derivatives;

(B) amino containing oligosaccharides such as amino containing olygocellulose or olygomanose can be used to provide anchoring groups for crosslinking of guar or other galactomanans with xanthan, diutan or other heteropolysaccharides;

(C) primary amine containing functionalized anyline derivatives of structures, such as 1,2-dihydroxy-4-aminobenzene, 2-hydroxy-4-aminobenzoic acid, 2-boronic-4-aminophenol, 3-boronic-4-hydroxymethylanyline, 3-hydroxy-4-hydroxymethylanyline, and the like, can be used to provide points for stronger polysaccharide crosslinking with metallic crosslinkers such as boron or aluminum, (D) primary amine containing carboxylic acids, commonly known as amino acids, can be used to provide points for stronger polysaccharide crosslinking with metallic crosslinkers such as zirconium, and or titanium;

(E) in particular amino acids with more than two functional groups such as primary amine containing hydroxyacids, such as serine, tyrosine, or threonine, amino acids containing more than one amino group such as asparagine, lysine, or arginine, and polycarboxylic amino acids such as glutamic acid, or aspartic acid can be used to provide points for stronger polysaccharide crosslinking with metallic crosslinkers such as zirconium, and or titanium;

(F) long chain amines such as oleylamine, palmitoyl amine, stearylamine and other can be used to provide points for hydrophobic interaction between polymers and interaction with other hydrophobic associating structures such as viscoelastic surfactants.

In yet another embodiment, the viscosity development is delayed by means of the introduction of crosslinkable functional moeties such as carboxylate groups through reaction of a suitable linking chemical containing those with a polymer containing sites that do not act as effective crosslinking points for a given class of crosslinkers, or a polymer that only contains an insufficient concentration of crosslinkable points, so as to yield an insufficiently high degree of crosslinking when reacted with common crosslinkers such as Zr or Ti and the like. Examples of polymers suitable for this embodiment are guar polysaccharides, and guar derivatives containing alcohol groups ("U" groups). These polymers can be reacted through an SN mechanism with Bromide or Chloride ("V" groups) containing linking molecules such as chloroacetic acid, chloropropionic acid, bromoacetic acid, bromopropionic acid and the like, where the resulting polymer is a carboxylic acid containing polymer. Other examples of polymers suitable for this embodiment are oxidized guar polysaccharides, and guar derivatives containing aldehyde groups ("U" groups). These polymers can be reacted through a condensation mechanism with amine ("V" groups) containing linking molecules such as alpha amino acids such as alanine, arginine, asparagine, aspartic acid, glutamic acid, glutamine, glycine, histidine, lysine, leucine, isoleucine, methionine, proline, serine, threonine, tryptophan, tyrosine, valine, and the like, beta amino acids such as beta alanine, 3-aminopropionic acid, 3-Aminobutyric acid, chloroacetic acid, chloropropionic acid, bromoacetic acid, bromopropionic acid and the like, and other amino acids and amino acid precursors such as epsilon aminocaproic acid, epsilon caprolactam, betalactams, gamma lactams and deltalactams where the resulting polymer after delayed reaction downhole is a carboxylic acid containing polymer.

The above resulting reactions aiming to functionalize the polysaccharide are carried out preferentially in aqueous based media, and may be carried out at the wellsite, through a batch-mixed operation, or on-the-fly.

In some embodiments, molecules that comprise strong organometallic bonds, and that can be used as extended crosslinkers are disclosed. Such molecules would have structures of the generic form:

X—$R_1$—Y M-$R_2$-M Y—$R_1$—X

The structures could be for instance, diamino terminated organic structures that are obtained by reaction of a diboronic acid, such as 1-4-benzenediboronic acid (I), with 2-hydroxy-4-aminobenzoic acid (II). In this case X=$NH_2$, $R_1$=benzene ring from (I), Y=2-hydroxy, 1-carboxy groups from (II), M=Boronic acid, and $R_2$=benzene ring from (II).

In some embodiments, peptides according to the structure $H_2N$—CHR—CO—(NH—CHR—CO—)$_n$ and similar can be used and result in a crosslinked species that can further enhance particle transportation. The peptide bonds present in the crosslinked part of the molecule are not stable at high temperature, and can degrade with time. The length of the peptide linkage can be altered to provide the required stability of the resulting fluid.

The following examples are presented to illustrate the preparation and properties of some embodiments of the invention, and should not be construed to limit the scope of the invention, unless otherwise expressly indicated in the appended claims. All percentages, concentrations, ratios, parts, etc. are by weight unless otherwise noted or apparent from the context of their use.

EXAMPLES

For some of the examples below, a 1% guar polyaldehyde stock solution was prepared by fully dissolving 0.53 g of guar polyaldehyde (available from Carbomer Inc.) containing 0.1 mmol of aldehyde per gram of guar in 53 ml of tap water. Various fluids were prepared according to the formulations in Examples 1 through 20 as described in Table 1 by dissolving the required reactants in approximately 2 ml of said 1% guar polyaldehyde stock solution in a closed 4 ml glass vial. The reactants used for the prepared example formulations were:

| A-1 | sodium hydroxide |
| A-2 | tetraborate decahydrate |
| A-3 | Glycerol |
| A-4 | Zirconyl oxydichloride |
| A-5 | N'-(2-aminoethyl)-N-[2-(2-aminoethylamino)ethyl]ethane-1,2-diamine |
| A-6 | 2,2',2''-nitrilotriethanol |
| A-7 | 2-aminopentanedioic acid |
| A-8 | 2-amino-3,4,5,6-tetrahydroxyhexanal hydrochloride |

In order to allow for the reaction between the aldehyde groups in the guar polyaldehyde and the amino groups in additives A-7 and A-8, the concentrations of these additives in between brackets in Table 1 were dissolved in the guar polyaldehyde 15 minutes prior to the addition of the other reactants.

The apparent fluid viscosity was monitored at various time intervals (1 min, 3 min, 5 min, 10 min, and 1 hour) for apparent viscosity changes. The viscosity of each fluid was rated according the following qualitative gel strength codes and criteria:
1. Fluid viscosity same as original polymer solution
2. Fluid viscosity slightly higher than original solution
3. Significantly cross-linked flowing gel; easy to remove from vial by gravity
4. "Lipping" gel that flows upon vial inversion; difficult to remove from vial by gravity.
5. Gel that barely flows upon vial inversion; very difficult to remove from vial by gravity.
6. Solid gel that deforms but does not flow upon vial inversion; essentially impossible to remove from vial by gravity.

In addition, the gelling rate (the rate of fluid viscosity increase) for each fluid was qualitatively evaluated. Fluids developing full viscosity in less than one minute were rated "instantaneous". Fluids developing full viscosity in less than three minutes were rated "very fast". Fluids developing full viscosity in less than five minutes were rated "fast". Fluids developing full viscosity in less than ten minutes were rated "moderate". Fluids developing full viscosity in less than one hour were rated "slow". Fluids not developing substantial viscosity increase in one hour were rated "N/A".

Table 1 lists the gel strength code and the gelling rate for the formulations prepared according to examples 1 through 20. The concentrations of the additives are given in the Table in %. The concentration of additives A-7 and A-8 in brackets were added to the polymer solution 15 minutes (wait period) prior to the addition of the other additives. For examples 15, 16 and 20 additional concentrations of 0.4%, 0.4% and 1.2% additive A-7 were added 15 minutes after a first concentration of 0.5% was allowed to react with the polymer.

The fluid formulations are described in greater detail in the following examples:

Example 1

2.0 ml of a solution containing 1% guar polyaldehyde solution were placed in a closed 4 ml glass vial, and the fluid viscosity was monitored over time.

Example 2

2.1 ml of a solution containing 1% guar polyaldehyde and 0.5% sodium hydroxide were placed in a closed 4 ml glass vial, and the fluid viscosity was monitored over time.

Example 3

2.1 ml of a solution containing 1% guar polyaldehyde, 0.75% sodium tetraborate decahydrate, and 1.25% glycerol were placed in a closed 4 ml glass vial, and the fluid viscosity was monitored over time.

Example 4

2.2 ml of a solution containing 1% guar polyaldehyde, 0.5% sodium hydroxide, 0.75% sodium tetraborate decahydrate, and 1.25% glycerol were placed in a closed 4 ml glass vial, and the fluid viscosity was monitored over time.

Example 5

2.1 ml of a solution containing 1% guar polyaldehyde, 1.55% 2,2',2"-nitrilotriethanol, 0.3% sodium tetraborate, 0.25% zirconyl oxydichloride, and 0.4% 2-aminopentanedioic acid were placed in a closed 4 ml glass vial, and the fluid viscosity was monitored over time.

Example 6

2.2 ml of a solution containing 1% guar polyaldehyde, 5% of N'-(2-aminoethyl)-N-[2-(2-aminoethylamino)ethyl]ethane-1,2-diamine, 1.55% 2,2',2"-nitrilotriethanol, 0.3% sodium tetraborate, 0.25% zirconyl oxydichloride, and 0.4% 2-aminopentanedioic acid were placed in a closed 4 ml glass vial, and the fluid viscosity was monitored over time.

Example 7

2.1 ml of a solution containing 1% guar polyaldehyde and 5% of N'-(2-aminoethyl)-N-[2-(2-aminoethylamino)ethyl]ethane-1,2-diamine were placed in a closed 4 ml glass vial, and the fluid viscosity was monitored over time.

Example 8

2.1 ml of a solution containing 1% guar polyaldehyde, and 5% 2-amino-3,4,5,6-tetrahydroxyhexanal hydrochloride were placed in a closed 4 ml glass vial, and the fluid viscosity was monitored over time.

Example 9

2.2 ml of a solution containing 1% guar polyaldehyde, 0.5% sodium hydroxide, and 5% 2-amino-3,4,5,6-tetrahydroxyhexanal hydrochloride were placed in a closed 4 ml glass vial, and the fluid viscosity was monitored over time.

Example 10

2.3 ml of a solution containing 1% guar polyaldehyde, 0.5% sodium hydroxide, 0.75% sodium tetraborate decahydrate, 1.25% glycerol, and 5% 2-amino-3,4,5,6-tetrahydroxyhexanal hydrochloride were placed in a closed 4 ml glass vial, and the fluid viscosity was monitored over time.

Example 11

2.3 ml of a solution containing 1% guar polyaldehyde, 5% of N'-(2-aminoethyl)-N-[2-(2-aminoethylamino)ethyl]ethane-1,2-diamine, 1.55% 2,2',2"-nitrilotriethanol, 0.3% sodium tetraborate, 0.25% zirconyl oxydichloride, 0.4% 2-aminopentanedioic acid, and 5% 2-amino-3,4,5,6-tetrahydroxyhexanal hydrochloride were placed in a closed 4 ml glass vial, and the fluid viscosity was monitored over time.

Example 12

2.2 ml of a solution containing 1% guar polyaldehyde, 1.55% 2,2',2"-nitrilotriethanol, 0.3% sodium tetraborate, 0.25% zirconyl oxydichloride, 0.4% 2-aminopentanedioic acid, and 5% 2-amino-3,4,5,6-tetrahydroxyhexanal hydrochloride were placed in a closed 4 ml glass vial, and the fluid viscosity was monitored over time.

Example 13

2.3 ml of a solution containing 1% guar polyaldehyde, 5% 2-amino-3,4,5,6-tetrahydroxyhexanal hydrochloride, and 5% of N'-(2-aminoethyl)-N-[2-(2-aminoethylamino)ethyl]ethane-1,2-diamine were placed in a closed 4 ml glass vial, and the fluid viscosity was monitored over time.

Example 14

2.1 ml of a solution containing 1% guar polyaldehyde, and 0.5% 2-aminopentanedioic acid were placed in a closed 4 ml glass vial, and the fluid viscosity was monitored over time.

Example 15

2.3 ml of a solution containing 1% guar polyaldehyde, 5% of N'-(2-aminoethyl)-N-[2-(2-aminoethylamino)ethyl]ethane-1,2-diamine, 1.55% 2,2',2"-nitrilotriethanol, 0.3% sodium tetraborate, 0.25% zirconyl oxydichloride, and 0.9% 2-aminopentanedioic acid were placed in a closed 4 ml glass vial, and the fluid viscosity was monitored over time.

Example 16

2.2 ml of a solution containing 1% guar polyaldehyde, 1.55% 2,2',2"-nitrilotriethanol, 0.3% sodium tetraborate, 0.25% zirconyl oxydichloride, and 0.9% 2-aminopentanedioic acid were placed in a closed 4 ml glass vial, and the fluid viscosity was monitored over time.

Example 17

2.3 ml of a solution containing 1% guar polyaldehyde, 5% of N'-(2-aminoethyl)-N-[2-(2-aminoethylamino)ethyl]ethane-1,2-diamine, and 0.5% 2-aminopentanedioic acid were placed in a closed 4 ml glass vial, and the fluid viscosity was monitored over time.

Example 18

2.5 ml of a solution containing 1% guar polyaldehyde, 0.5% sodium hydroxide, 2.25% sodium tetraborate decahydrate, and 3.75% glycerol, and 5% 2-amino-3,4,5,6-tetrahydroxyhexanal hydrochloride were placed in a closed 4 ml glass vial, and the fluid viscosity was monitored over time.

Example 19

2.4 ml of a solution containing 1% guar polyaldehyde, 4.65% 2,2',2"-nitrilotriethanol, 0.9% sodium tetraborate, 0.75% zirconyl oxydichloride, 1.2% 2-aminopentanedioic acid, and 5% 2-amino-3,4,5,6-tetrahydroxyhexanal hydrochloride were placed in a closed 4 ml glass vial, and the fluid viscosity was monitored over time.

Example 20

2.2 ml of a solution containing 1% guar polyaldehyde, 4.65% 2,2',2"-nitrilotriethanol, 0.9% sodium tetraborate, 0.75% zirconyl oxydichloride, and 1.7% 2-aminopentanedioic acid were placed in a closed 4 ml glass vial, and the fluid viscosity was monitored over time.

Comparison of examples 7 and 17 shows that the condensation between the aldehyde containing polymer and the monoamine containing additive A-8 (with pendant carboxylic acid groups) did also impair further reaction of the aldehyde polymer with the polyamine A-5, showing that a substantial amount of the initial aldehyde groups were reacted with the amine groups of additive A-8 during the 15 minute wait period, thus yielding polymers with new pendant carboxylic acid functional groups that did not subsequently crosslink with the polyamine A-5.

TABLE 1

Gel strength and gelling rates for fluid formulations prepared according to examples 1 to 20

| Example | A-1 (%) | A-2 (%) | A-3 (%) | A-4 (%) | A-5 (%) | A-6 (%) | A-7 (%) | A-8 (%) | Gel Strength | Gelling Rate |
|---|---|---|---|---|---|---|---|---|---|---|
| 1 | | | | | | | | | 1 | N/A |
| 2 | 0.5 | | | | | | | | 1 | N/A |
| 3 | | 0.75 | 1.25 | | | | | | 4 | very fast |
| 4 | 0.5 | 0.75 | 1.25 | | | | | | 5 | very fast |
| 5 | | 0.3 | | 0.25 | | 1.55 | 0.4 | | 4 | fast |
| 6 | | 0.3 | | 0.25 | 5 | 1.55 | 0.4 | | 6 | Instantaneous |
| 7 | | | | | 5 | | | | 1-2 | N/A |
| 8 | | | | | | | | (5) | 1 | N/A |
| 9 | 0.5 | | | | | | | (5) | 1 | N/A |
| 10 | 0.5 | 0.75 | 1.25 | | | | | (5) | 2 | moderate |
| 11 | | 0.3 | | 0.25 | 5 | 1.55 | 0.4 | (5) | 2 | moderate |
| 12 | | 0.3 | | 0.25 | | 1.55 | 0.4 | (5) | 2 | slow |
| 13 | | | | | 5 | | | (5) | 1 | N/A |
| 14 | | | | | | | (0.5) | | 1 | N/A |
| 15 | | 0.3 | | 0.25 | 5 | 1.55 | (0.5) + 0.4 | | 3 | moderate |
| 16 | | 0.3 | | 0.25 | | 1.55 | (0.5) + 0.4 | | 3 | slow |
| 17 | | | | | 5 | | (0.5) | | 1 | N/A |
| 18 | 0.5 | 2.25 | 3.75 | | | | | (5) | 6 | fast |
| 19 | | 0.9 | | 0.75 | | 4.65 | 1.2 | (5) | 6 | moderate |
| 20 | | 0.9 | | 0.75 | | 4.65 | (0.5) + 1.2 | | 6 | fast |

Comparison of examples 1 and 2 shows that the aldehyde and hydroxyl containing guar polyaldehyde polymer did not self condense at a high pH (adjusted with sodium hydroxide). Comparison of examples 1 and 2 with example 7 indicates that a slight viscosity increase due to the crosslinking reaction between the aldehyde containing polymer and the polyamine additive A-5.

Examples 3 and 4 show that the guar polyaldehyde polymer is capable of producing borate crosslinked gels. Examples 5 and 6 show that the guar polyaldehyde polymer is capable of producing crosslinked gels with boro-zirconate crosslinkers. Comparison of examples 3 and 5, and 4 and 6 shows that stronger zirconate crosslinked can be obtained with a boro-zirconate crosslinker than with a pure borate fluid even at lower boron concentrations.

Comparison of examples 1, 8, 9 and 14 shows that the condensation between the aldehyde containing polymer and the monoamine containing additives A-7 (with pendant hydroxyl groups) or A-8 (with pendant carboxylic acid groups) did not result in crosslinking nor in any apparent viscosity increase.

Comparison of examples 7 and 13 shows that the condensation between the aldehyde containing polymer and the monoamine containing additive A-7 (with pendant hydroxyl groups) did impair further reaction of the aldehyde polymer with the polyamine A-5, showing that a substantial amount of the initial aldehyde groups were reacted with the amine groups of additive A-7 during the 15 minute wait period, yielding thus polymers with new additional pendant hydroxyl functional groups that did not subsequently crosslink with the polyamine A-5.

The results obtained for examples 10, 11, and 12 indicate that the modified hydroxyl pendant group containing polymer prepared according to example 8 still retains the ability to interact with typical borate or boro-zirconate crosslinkers. Comparison of examples 10, 11 and 12 with examples 4, 5 and 6 shows that the gelling rate is decreased for the former compared to the later. This is attributed to the excess unreacted additive A-8 which pertains to a class of chemicals known to delay and reduce the extent of the borate crosslinking by complexing with the borate ion.

In order to verify that improved crosslinked fluid could be obtained with the polymer containing pendant hydroxyl groups resulting from the condensation of the guar polyaldehyde and the amino-containing polyol A-7, the concentration of the crosslinking species was increased in examples 18 and 19. Comparison of examples 18 and 19 with examples 10 and 12 shows that indeed better crosslinked gels (higher gel strength) and faster crosslinking kinetics can be obtained by modifying the crosslinker concentration.

The results obtained for examples 15, and 16 indicate that the modified carboxylic acid pendant group containing polymer prepared according to example 14 still retains the ability to interact with typical boro-zirconate crosslinkers. Comparison of examples 15 and 16 with examples 5 and 6, shows that the gelling rate is decreased for the former compared to the later. This is also attributed to the excess unreacted additive A-7 which pertains to a class of chemicals known to delay and reduce the extent of the zirconate crosslinking by complexing with the zirconate ion.

In order to verify that improved crosslinked fluid could also be obtained with the polymer containing pendant carboxylic acid groups resulting from the condensation of the guar polyaldehyde and the amino-containing polycarboxylic acid A-7, the concentration of the crosslinking species was increased in example 20. Comparison of example 20 with examples 15 and 16 shows that indeed better crosslinked gels (higher gel strength) and faster crosslinking kinetics can be obtained by modifying the crosslinker concentration.

Those skilled in the art will easily recognize that the extent of the modification reaction of the guar polyaldehyde solution with 2-amino-3,4,5,6-tetrahydroxyhexanal hydrochloride (additive A-8) shown in the above described examples can be controlled by the stoichiometry (ratio of aldehyde to amine groups), the reaction time (wait time) and the temperature at which the reactions is carried out. Similarly, it will also be easy to recognize that the extent of the modification reaction of the guar polyaldehyde solution with 2-aminopentanedioic acid (additive A-7) shown in the above described examples can also be controlled by the stoichiometry (ratio of aldehyde to amine groups), the reaction time (wait time), and the temperature at which the reactions is carried out. Stoichiometry and reaction time are parameters that can be easily controlled in a wellbore treating operation by modifying the additive feed concentrations, and the treatment flow rate. In addition, temperature can be primarily modified by altering the temperature of the aqueous brine, and additionally by altering the treatment flow rate allowing for a longer or shorter contact period with the formations neighboring the wellbore.

The particular embodiments disclosed above are illustrative only, as the invention may be modified and practiced in different but equivalent manners apparent to those skilled in the art having the benefit of the teachings herein. Furthermore, no limitations are intended to the details herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed is:

1. A method of treating a subterranean formation with a fluid, the method comprising
   a) providing a fluid comprising:
      i. a crosslinker

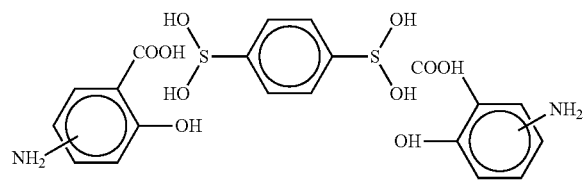

derived from a reaction product of 1,4-benzenediboronic acid and 2-hydroxy-4-aminobenzoic acid; and
   ii. a polysaccharide or cellulosic material comprising oxidized functional groups; and b) introducing the fluid into a wellbore penetrating the formation and causing the fluid to contact the formation.

2. The method of claim 1 wherein the polysaccharide or cellulosic material comprises aldehyde groups.

3. The method of claim 1 wherein the fluid further comprises an inorganic crosslinker to achieve delay and high temperature stability.

4. The method of claim 1 wherein the fluid is self breaking.

5. The method of claim 1 wherein the fluid has a pH between about 2 to about 9, and wherein the treatment is one of hydraulic fracturing, acid fracturing, gravel packing, frac and pack treatment, wellbore cleanouts, or kill pill application.

6. The method of claim 1 wherein aqueous medium is used to form the fluid, wherein the aqueous medium is contaminated, and whereby fluid viscosity is essentially unaltered by contaminants present in the aqueous medium.

7. The method of claim 1 wherein the polysaccharide or the cellulosic material is at least partially oxidized prior to hydrating or while hydrating in an aqueous medium.

8. The method of claim 1 wherein the polysaccharide or the cellulosic material is oxidized using at least one of an enzymes, oxidizers, photooxidation, bacteria or catalyst.

9. The method of claim 1 wherein the polysaccharide or cellulosic material has polyaldehyde functionality crosslinkable with an organometallic crosslinker.

10. The method of claim 9, wherein the polysaccharide or cellulosic material is oxidized in situ during an operation to provide a polyaldehyde functionality.

11. A method comprising:
    a) providing a fluid comprising a crosslinker

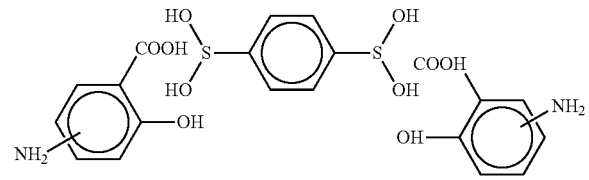

derived from a reaction product of 1,4-benzenediboronic acid and 2-hydroxy-4-aminobenzoic acid; and a polysaccharide or cellulosic material comprising oxidized functional groups; and
    b) contacting a target material with the fluid to treat a target zone in a subterranean formation.

12. The method of claim 11 wherein the polysaccharide or cellulosic material comprises aldehyde groups.

13. The method of claim 11 wherein aqueous medium is used to form the fluid, wherein the aqueous medium is contaminated, and whereby fluid viscosity is essentially unaltered by contaminants present in the aqueous medium.

14. The method of claim 11 wherein the polysaccharide or cellulosic material is oxidized in situ during a treatment to provide a polyaldehyde functionality.

* * * * *